(12) United States Patent
Hu

(10) Patent No.: US 10,761,328 B2
(45) Date of Patent: Sep. 1, 2020

(54) DISPLAY GLASSES USING META-SURFACE PLANAR LENS

(71) Applicant: Darwin Hu, San Jose, CA (US)

(72) Inventor: Darwin Hu, San Jose, CA (US)

( * ) Notice: Subject to any disclaimer, the term of this patent is extended or adjusted under 35 U.S.C. 154(b) by 319 days.

(21) Appl. No.: 15/804,810

(22) Filed: Nov. 6, 2017

(65) Prior Publication Data
US 2019/0137762 A1    May 9, 2019

(51) Int. Cl.
*G02B 27/01* (2006.01)
*G02B 27/14* (2006.01)

(52) U.S. Cl.
CPC ....... *G02B 27/0172* (2013.01); *G02B 27/144* (2013.01); *G02B 2027/0178* (2013.01)

(58) Field of Classification Search
None
See application file for complete search history.

(56) References Cited

U.S. PATENT DOCUMENTS

2016/0313494 A1\* 10/2016 Hamilton ............. G02B 6/0068

\* cited by examiner

*Primary Examiner* — Jennifer D. Carruth
(74) *Attorney, Agent, or Firm* — Joe Zheng

(57) ABSTRACT

Designs of display devices using one or more planar lenses are described. According to one aspect of the present invention, a planar lens includes at least a substrate and a plurality of nanosized studs. Depending on the implementation, the objects may be in different heights, spaced evenly or unevenly and oriented towards or outwards a focal point. When the planar lens is used with a lightguide guide that receives an image projected from a source, the image can be seen in the lightguide guide enlarged through the planar lens, provided that nanosized studs are properly structured, sized, oriented and arranged in a predefined pattern.

19 Claims, 13 Drawing Sheets

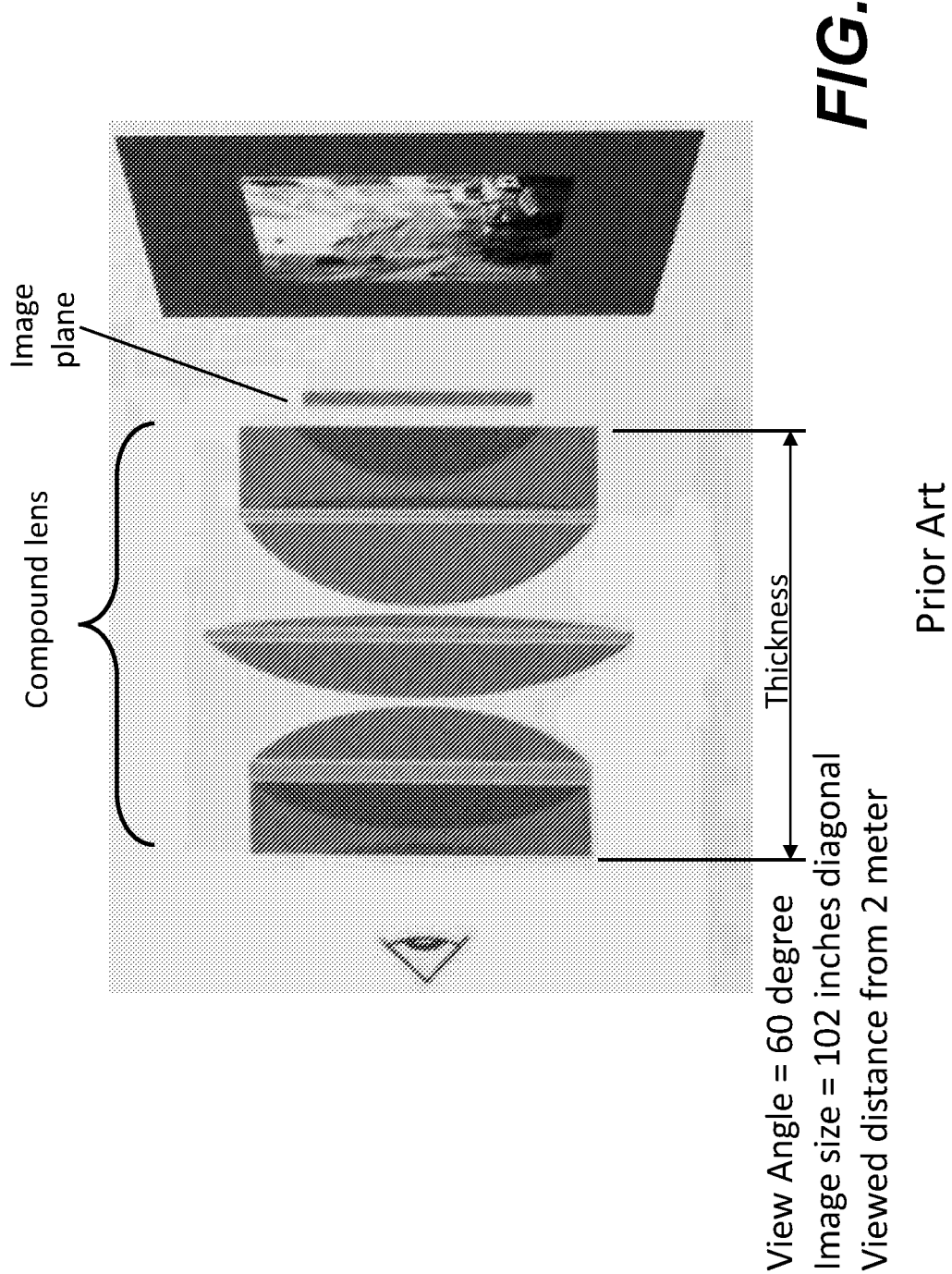

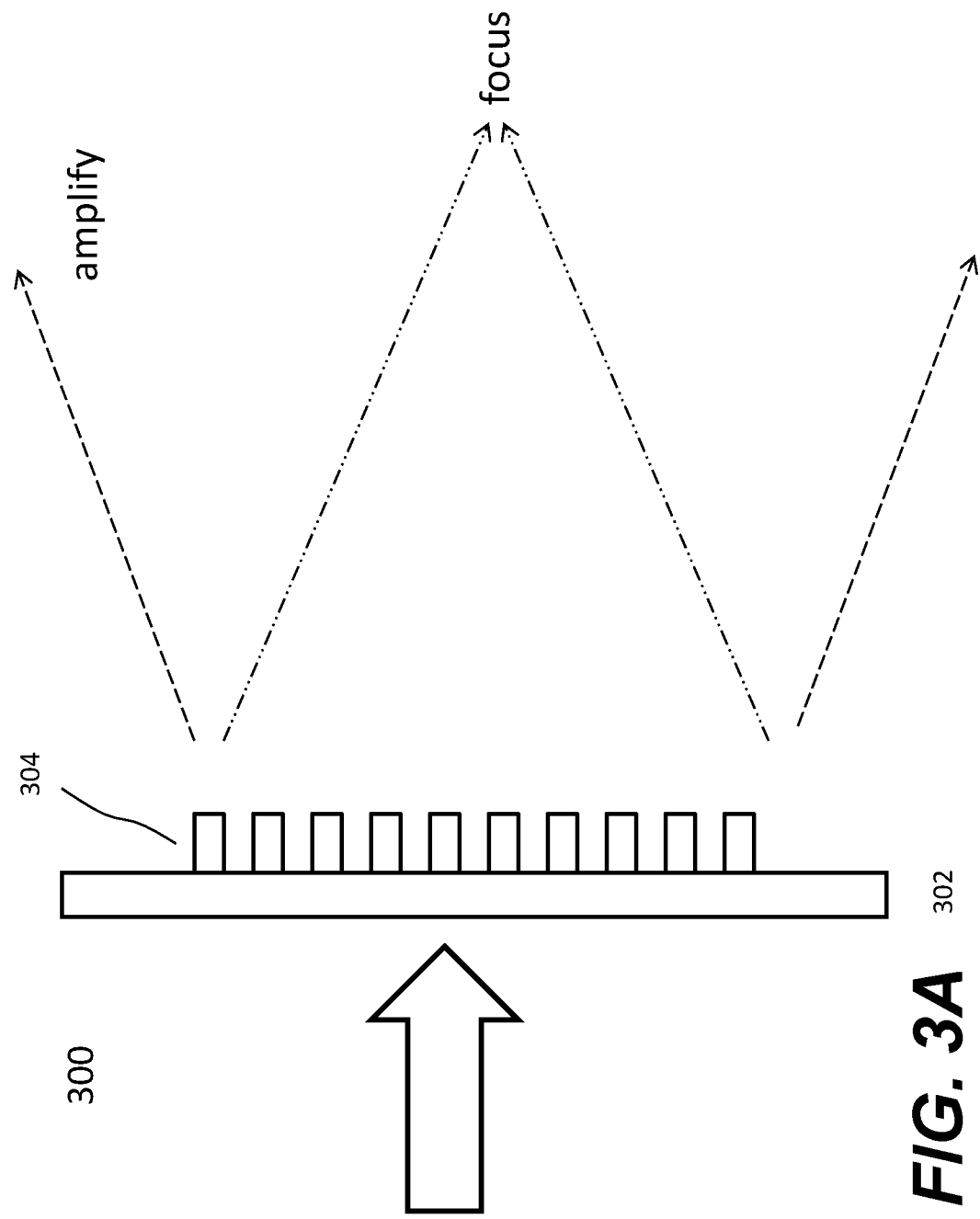

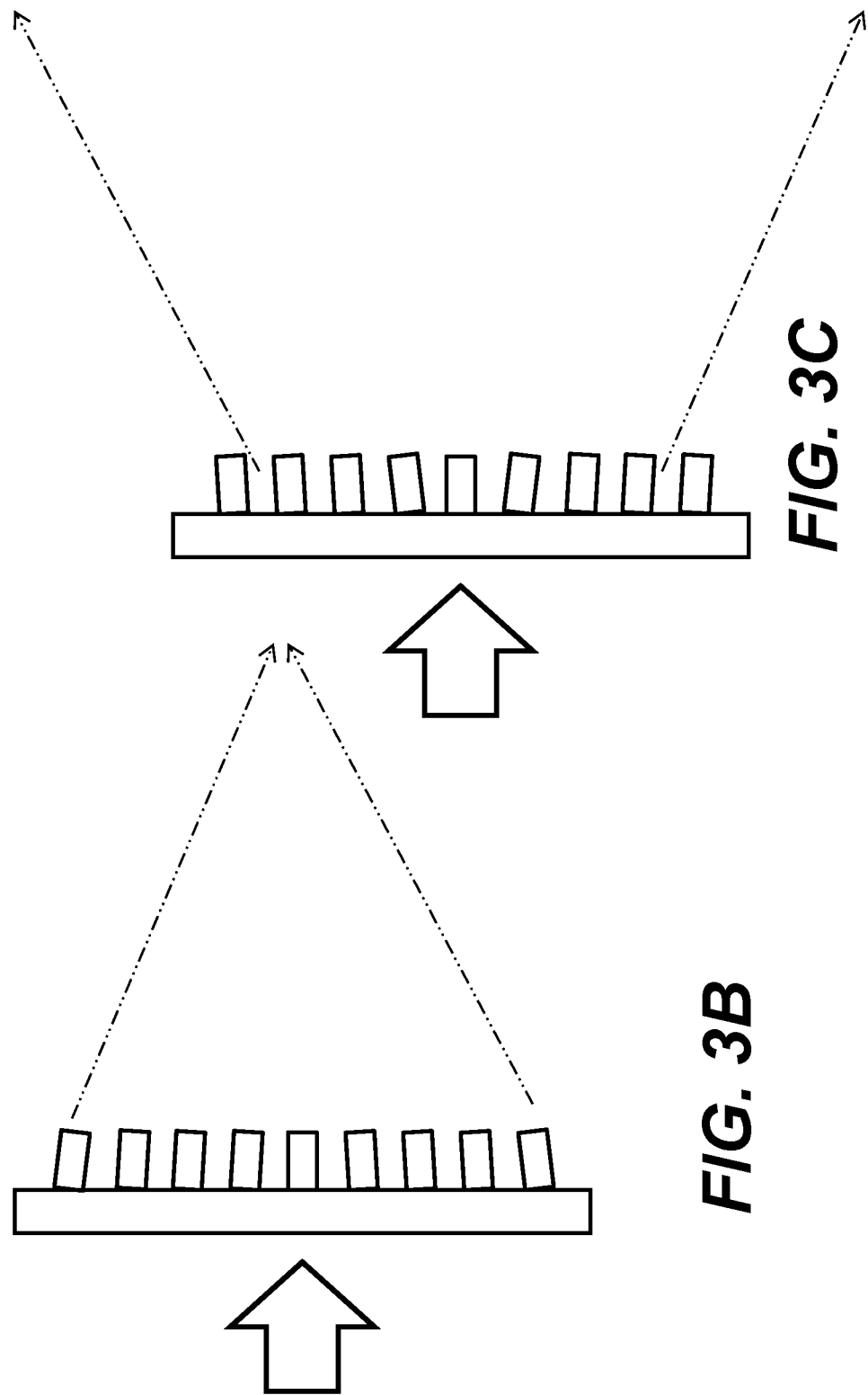

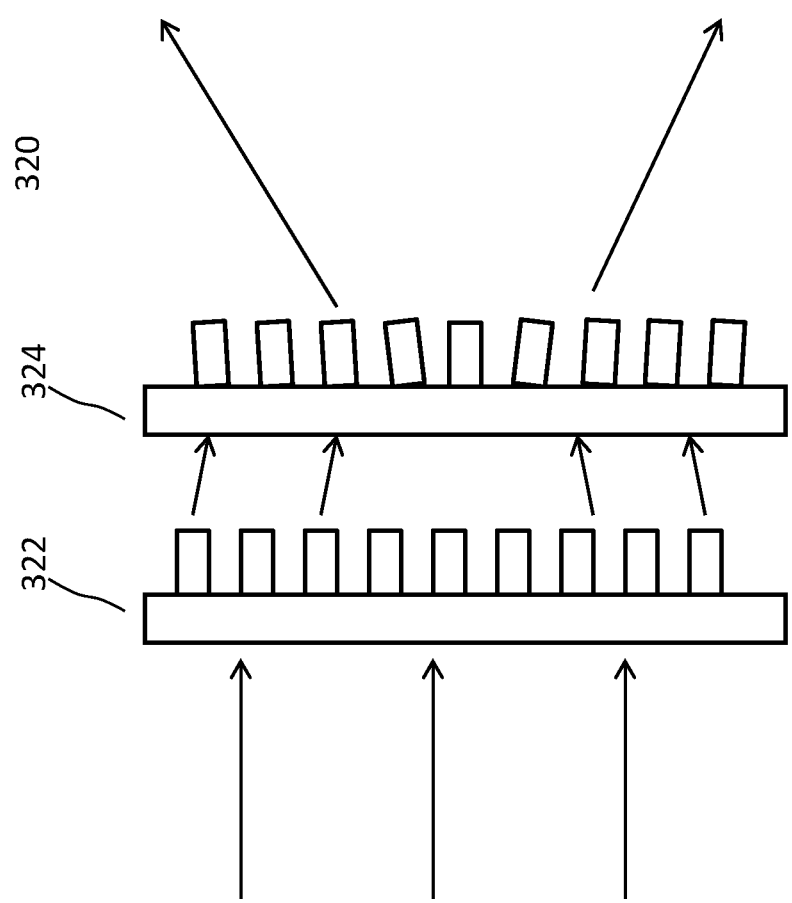

DISPLAY GLASSES USING META-SURFACE PLANAR LENS

BACKGROUND OF THE INVENTION

Field of the Invention

The present invention generally relates to the area of optical lens and more particularly relates to architecture and designs of optical lens using flat optical lens, where the optical lens is advantageously used in wearable display glasses for various applications including virtual reality augmented reality with 3D capabilities.

Description of the Related Art

Virtual Reality or VR is generally defined as a realistic and immersive simulation of a three-dimensional environment created using interactive software and hardware, and experienced or controlled by movement of the body. A person using virtual reality equipment is typically able to look around the artificially generated three-dimensional environment, moves around in it and interacts with features or items that are depicted on a screen or in goggles. Virtual realities artificially create sensory experiences, which can include sight, touch, hearing, and, less commonly, smell.

Augmented reality (AR) is a technology that layers computer-generated enhancements atop an existing reality in order to make it more meaningful through the ability to interact with it. AR is developed into apps and used on mobile devices to blend digital components into the real world in such a way that they enhance one another, but can also be told apart easily. AR technology is quickly coming into the mainstream. It is used to display score overlays on telecasted sports games and pop out 3D emails, photos or text messages on mobile devices. Leaders of the tech industry are also using AR to do amazing and revolutionary things with holograms and motion activated commands.

The delivery methods of Virtual Reality and Augmented Reality are different when viewed separately. Most 2016-era virtual realities are displayed either on a computer monitor, a projector screen, or with a virtual reality headset (also called head-mounted display or HMD). HMDs typically take the form of head-mounted goggles with a screen in front of the eyes. Virtual Reality actually brings the user into the digital world by cutting off outside stimuli. In this way user is solely focusing on the digital content being displayed in the HMDs. Augmented reality is being used more and more in mobile devices such as laptops, smart phones, and tablets to change how the real world and digital images, graphics intersect and interact.

In reality, it is not always VR vs. AR as they do not always operate independently of one another, and in fact are often blended together to generate an even more immersing experience. For example, haptic feedback, which is the vibration and sensation added to interaction with graphics, is considered an augmentation. However, it is commonly used within a virtual reality setting in order to make the experience more lifelike though touch.

Virtual reality and augmented reality are great examples of experiences and interactions fueled by the desire to become immersed in a simulated land for entertainment and play, or to add a new dimension of interaction between digital devices and the real world. Alone or blended together, they are undoubtedly opening up worlds, both real and virtual alike.

FIG. 1A shows an exemplary goggle now commonly seen in the market for the application of delivering or displaying VR or AR. No matter how a goggle is designed, it appears bulky and heavy, and causes inconvenience when worn on a user. Further most of the goggles cannot be seen through. In other words, when a user wears a goggle, he or she would not be able to see or do anything else. Thus, there is a need for an apparatus that can display the VR and AR but also allows a user to perform other tasks if needed.

Various wearable devices for AR/VR and holographic applications are being developed. FIG. 1B shows a sketch of HoloLens from Microsoft. It weights 579 g (1.2 lbs). With such weight, a wearer won't feel comfortable when wearing it for a period. Indeed, what is available in the market is generally heavy and bulky in comparison to normal glasses. Thus there is a further need for a wearable AR/VR viewing or display device that looks similar to a pair of regular glasses but is also amenable to smaller footprint, enhanced impact performance, lower cost packaging, and easier manufacturing process.

One of the components that make the weight in a goggle is the lenses. Although light materials have been tried, the thickness of the lens or lenses is significant in view of the lenses used in a pair of regular glasses. Thus there is a further need for a lens or lenses that can be made thinner and lighter so that a wearing device for the AR/VR applications could be made lighter or more similar to the regular glasses.

A lens is a transmissive optical device that focuses or disperses a light beam by means of refraction. A simple lens consists of a single piece of transparent material, while a compound lens consists of several simple lenses (elements), usually arranged along a common axis. Lenses are made from materials such as glass or plastic, and are ground and polished or moulded to a desired shape (e.g., to fit into an optical frame). Unlike a prism which refracts light without focusing, a lens is a transmissive optical device that focuses or disperses a light beam by means of refraction. A simple lens consists of a single piece of transparent material while a compound lens consists of several simple lenses (elements), usually arranged along a common axis. FIG. 2A shows an exemplary compound lens for use in AR/VR glasses. As shown in FIG. 2A, there are at least five individual lenses arranged in line-up along an optical axis. The spaces between the lenses are filled up with air which has a refractive index of 1.0. These individual lenses are of different shapes and made of materials of different refractive indices, arranged one after the other with an optical axis. A single lens is subject to the optical aberrations that can be compensated for to a great extent by using a combination of simple lenses with complementary aberrations, thus the compound lens. It can be appreciated that the compound lens of FIG. 2A, as most lenses in practical uses, are bulky and expensive. As wearable or portable devices are getting smaller in sizes, the lenses for imaging or video are becoming a challenge to fit into such devices. FIG. 2B illustrates the use of a compound lens on iPhone X, where the lens has to stick out from the back of the device because of its relative bulky size of the compound lens in the phone. In addition, the bulky size not only increases the lens cost, it also adds the weight. It would be desirable to have a single lens that achieves what a compound lens may achieve.

Despite tremendous interest in planar lenses in the visible spectrum, there has been no solution that simultaneously satisfies the demands for high numerical aperture (NA) and efficiency, let alone for high end imaging applications. The Capasso Group at Harvard University introduced a breakthrough solution for this problem using titanium dioxide-based metasurfaces that allow the miniaturization of conventional refractive optics into planar structures. The Harvard group shows that high-aspect-ratio titanium dioxide metasurfaces can be fabricated and designed as metalenses with NA=0.8. Diffraction-limited focusing is demonstrated at wavelengths of 405 nm (blue), 532 nm (green), and 660 nm (red) with corresponding efficiencies of 86, 73, and 66%. The metalenses can resolve nanoscale features separated by subwavelength distances and provide magnification as high as 170×, with image qualities comparable to a state-of-the-art commercial objective. However, as admitted by the group, it is still in the research phase, there are no such planar lenses available yet for commercial use.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to the designs of display devices using one or more planar lenses. According to one aspect of the present invention, a planar lens includes at least a substrate and a plurality of nanosized studs. As the name suggests, the nanosized studs are tiny transparent objects arranged in a pattern on the substrate. Depending on the implementation, the objects may be in different heights, spaced evenly or unevenly and oriented towards or outwards a focal point. According to another aspect of the present invention, the nanosized studs are formed on the substrate by electron beam lithography and atomic layer deposition.

According to still another aspect of the present invention, the nanosized studs are formed in layers on the substrate by electron beam lithography and atomic layer deposition. Depending on the purpose of the planar lens, the layers are in different materials, each of the materials reacts to or interacts with colors of a light differently.

According to still another aspect of the present invention, a display device includes an optical lightguide provided to receive an image and function as a medium to form the image therein. The lightguide is coated with the planar lens, wherein the image is seen through the planar lens. When the nanosized studs are properly structured in a pattern, the image can be seen enlarged through the planar lens.

According to another aspect of the present invention, the material used to form the nanosized studs includes a metamaterial being a material engineered to have a property that is not found in nature. The metamaterial has a relatively high refractive index at least greater than 2 and a level of stability, as well as high visible light transmittance. In one embodiment, the metamaterial is made from assemblies of multiple elements fashioned from composite materials.

According to yet another aspect of the present invention, the nanosized studs may be structured in different metamaterials, each of the metamaterials can be designed to react differently to the colors (wavelengths), phases and/or magnitudes, and deposited on top of each other, followed by etching process to shape/arrange the nanosized studs in a predefined volume/pattern. In addition, planar lenses with different characteristics can be stacked, matching the functions of a compound glass lens.

The present invention may be implemented as an apparatus, a method, a part of system. Different implementations may yield different benefits, objects and advantages. In one embodiment, the present invention is a display apparatus for displaying multimedia, the display apparatus comprises a planar lens system having at least one planar lens including a substrate and a plurality of nanosized studs, wherein the nanosized studs are formed on the substrate by electron beam lithography and atomic layer deposition; and an optical lightguide, receiving an image and forming the image therein, integrated with the planar lens system, wherein the image is seen through the planar lens system. Depending on implementation, the planar lens system may have only one single planar lens or multiple planar lenses stacked along an optical axis of the planar compound lens or system.

According to another embodiment, the present invention is a display apparatus for displaying multimedia, the display apparatus comprises: a planar lens system having at least one planar lens including at least a substrate, wherein a plurality of nanosized studs are formed on the substrate by electron beam lithography and atomic layer deposition, and an image source producing an image. The image source is integrated with the planar lens system, the image is then seen through the planar lens system, where the image is viewed either smaller or enlarged in size.

One of the objects in the present invention is to have a display device integrated with such a planar lens to reduce the physical size of the display device.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2A shows an exemplary compound lens for use in AR/VR glasses;

FIG. 3A shows a planar lens according to one embodiment of the present invention, the planar lens includes a transmissive optical substrate and a plurality of nanosized studs;

FIG. 3B illustrates one exemplary structure in which the nanosized studs are formed oriented towards the center of the planer lens, resulting in a focusing or reducing lens;

FIG. 3C illustrates one exemplary structure in which the nanosized studs are oriented outwards from the center of the planer lens, resulting in a defocusing or enlarging lens;

FIG. 3E shows an exemplary design of stacking two or more planar lenses to match the functions in a compound lens, where each of the planar lenses is designed in different optical characteristics;

DETAILED DESCRIPTION OF THE PREFERRED EMBODIMENTS

Figure 1A:
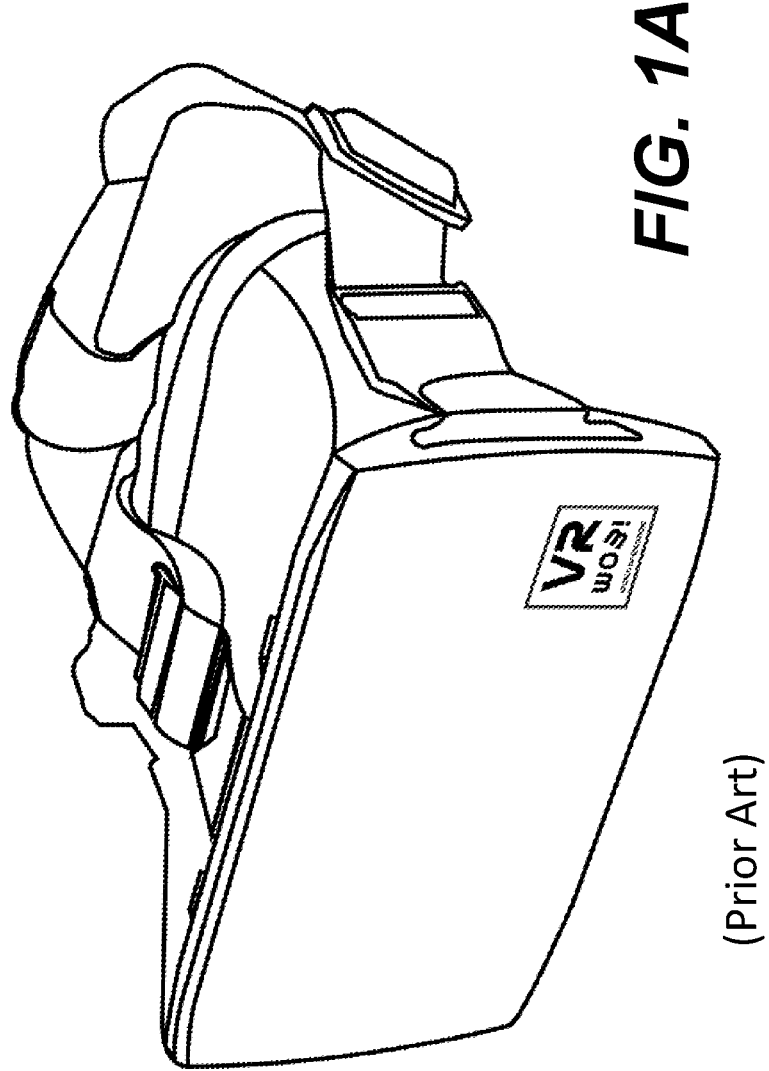
FIG. 1A shows an exemplary goggle now commonly seen in the market for the application of delivering or displaying VR or AR.
Figure 1B:
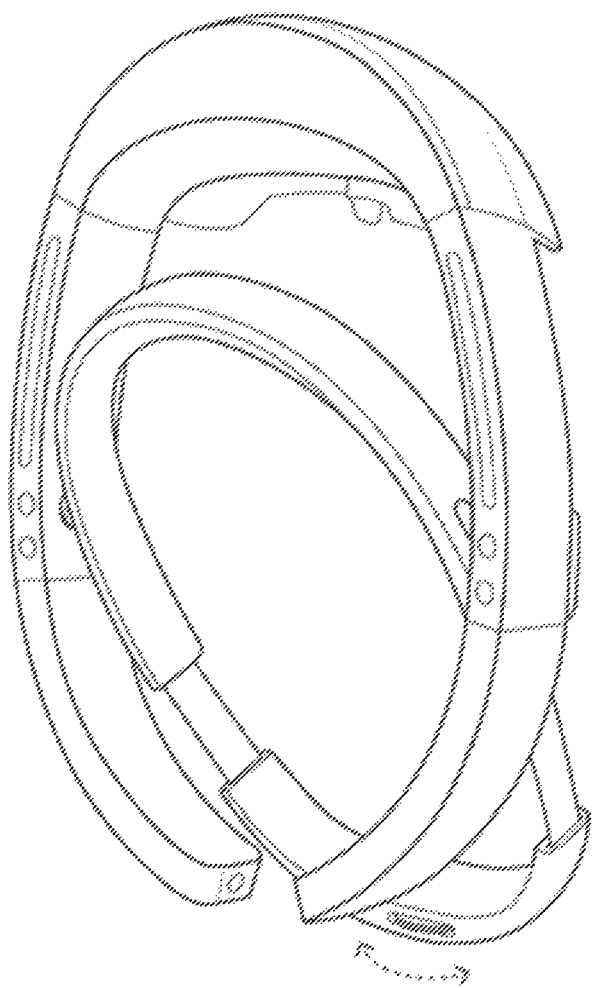
FIG. 1B shows a sketch of HoloLens from Microsoft.
Figure 2B:
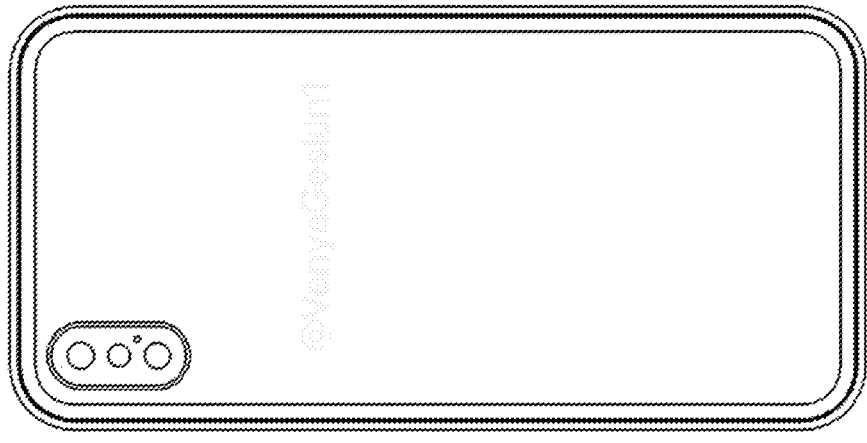
FIG. 2B illustrates the use of a compound lens on iPhone X, where the lens has to stick out from the back of the device because of its relative bulky size in the phone.
Figure 2B:
Figure 2B:
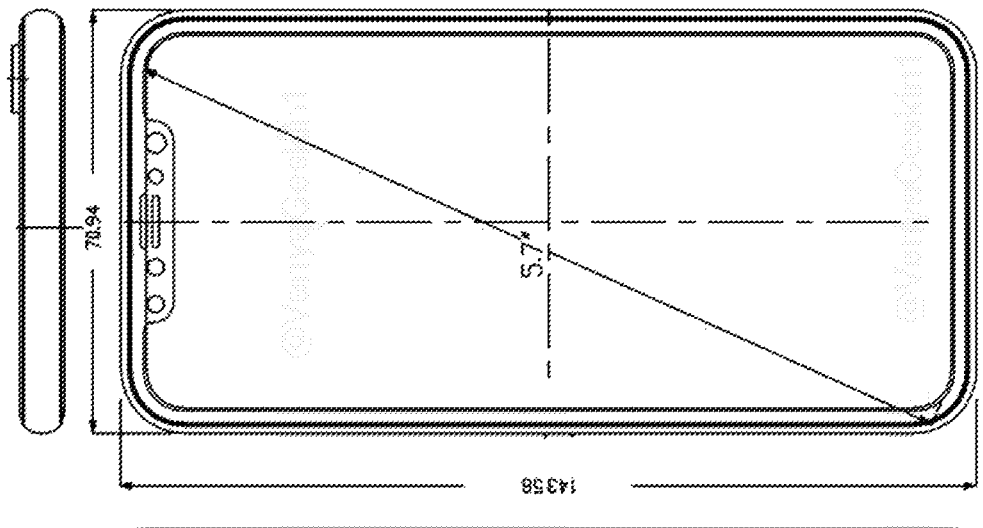
Figure 2B:
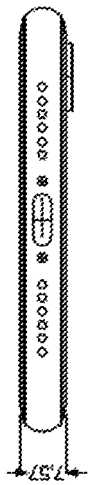

The detailed description of the invention is presented largely in terms of procedures, steps, logic blocks, processing, and other symbolic representations that directly or indirectly resemble an optical lens. The description and representations herein are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 3A-5B. However, those skilled in the art will readily appreciate that the detailed description given herein with respect to these figures is for explanatory purposes as the invention extends beyond these limited embodiments.

Referring now to the drawings, in which like numerals refer to like parts throughout the several views. FIG. 3A shows a planar lens 300 according to one embodiment of the present invention. The planar lens 300 includes a transmissive optical substrate 302 and a plurality of nanosized studs 304 that are thinner than a sheet of paper according to one embodiment. These nanosized studs 304 (e.g., 600 nm in length) are engineered to control the way in which light waves interact therewith. Depending on the implementation, the substrate 302 may be made flat or curved while the nanosized studs 304 are formed indifferent patterns. Different patterns focus different colors and bend lights with respect to the focal point, matching what happens in the glass lenses.

According to one embodiment, these nanosized studs 304 are formed by electron beam lithography and atomic layer deposition. According to another embodiment, the nanosized studs 304 are formed from so-called metamaterials. The nanosized studs 304 are structured to focus light across the visible spectrum. The setup allows them to magnify images up to 170 times with high resolution if the pattern of the nanosized studs 304 is properly structured and formed.

A metamaterial is a material engineered to have a property that is not found in nature. They are made from assemblies of multiple elements fashioned from composite materials such as metals or plastics. The materials are usually arranged in repeating patterns, at scales that are smaller than the wavelengths of the phenomena they influence. Metamaterials derive their properties not from the properties of the base materials, but from their newly designed structures. Their precise shape, geometry, size, orientation and arrangement gives them their unique properties capable of manipulating electromagnetic waves: by blocking, absorbing, enhancing, or bending waves, to achieve benefits that go beyond what is possible with conventional materials. In other words, appropriately designed metamaterials can affect waves of electromagnetic radiation or sound in a manner not observed in bulk materials.

According to one embodiment, amorphous titanium dioxide (TiO2) is used to be deposited onto a glass substrate (e.g., the substrate 302 of FIG. 3A) to make a nanosized studs 304. In other embodiments, other inorganic materials which have a relatively high optic index, low absorption to visible and/or other electromagnetic wavebands may be used to form these nanosized studs 304. According to one embodiment, vapor deposition and lithography are used to produce such nanosized studs 304. The two most common deposition methods are physical vapor deposition (PVD) and chemical vapor deposition (CVD). Depending on the material being used, either one may be used to produce high quality, technologically advanced thin films in mass production.

In theory, any metamaterial (e.g., silicon, germanium, and tellurium) that is sensitive to visible light, near Infrared, UV, and etc. may be used to be deposited on a transparent substrate to structure the nanosized studs that may be arranged in hexagonal lattice, square lattice, and etc. According to one embodiment, a type of metamaterial that has transmittance (>90%) and phase of the transmission (0~2 π) may be used, such as iron oxides, ZrO2. Some heavy metal transitional metal oxides, such as tungsten oxides, tantalum oxides, niobium pentoxide, molybdenum trioxide, etc. have a relatively high refractive index (e.g., >2) and a certain level of stability, as well as high visible light transmittance may be used as well.

Figure 3D:
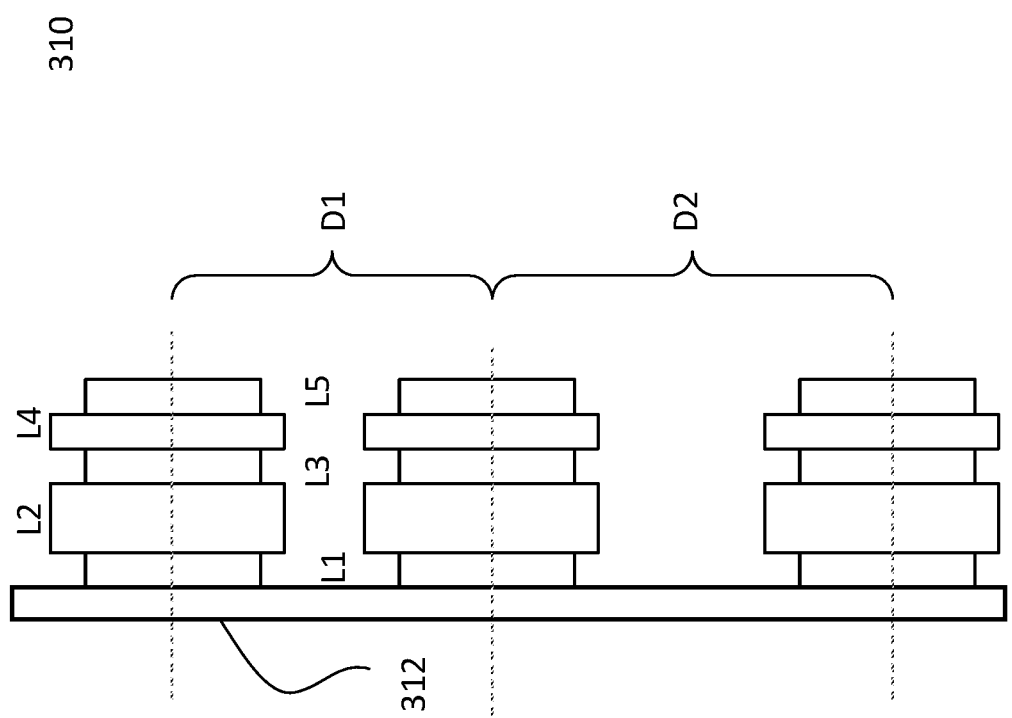
FIG. 3D shows an exemplary design of the nanosized studs according to one embodiment of the present invention.

The detailed structure of the nanosized studs 304 controls the functions of the planer lens 300 shown in FIG. 3A. Depending on how the nanosized studs 304 are made, oriented, arranged in different heights, or spaced differently, the planer lens 300 may have different optical characteristics. FIG. 3B illustrates one exemplary structure in which the nanosized studs 304 are oriented towards the center of the planer lens 300, resulting in a focusing or reducing lens. FIG. 3C illustrates one exemplary structure in which the nanosized studs 304 are oriented outwards from the center of the planer lens 300, resulting in a defocusing or enlarging lens. FIG. 3D shows an exemplary design 310 of the nanosized studs according to one embodiment of the present invention. Three studs are shown to have been formed on a transparent substrate 312. As an example, each of the studs is structured in five different layers L1, L2, L3, L4 and L5. In other word, these five different metamaterials are deposited individually. It is assumed that a nanosized stud is of round in cross-section, the diameters of these five different layers may or may not be identical to compensate for various possible optical aberrations (e.g., astigmatism, barrel distortion, chromatic, aberration, coma, distortion, field curvature, petzval dondition, pincushion distortion, and spherical aberration). Depending on the implementation, the actual shape of a nanosized stud (or each of the layers in a cross-section) may be in nano-disk, rod, V-shape and etc.

FIG. 3E shows an exemplary design 320 of stacking two planar lenses to match the functions in a compound lens, according to one embodiment of the present invention. It should noted that FIG. 3E shows only two planar lenses stacked to function what a compound glass lens does. The planar lenses in a compound lens are designed in different optical characteristics. As described above, a planar lens is typically in nanometer in thickness, thus a stack of planar lens is still significantly much thinner than a single glass lens, but delivering similar optical effects.

It is assumed that a first planar lens 322 in FIG. 3E is performing optical focusing, namely focusing an image impinged upon the planar lens 322 on the left. The image is focused onto a second planar lens 324 assumed to be designed to enlarge the image. Additional planar lens may be inserted between the first and second planar lens or before the first planar lens or after the second planar lens to compensate for various possible optical aberrations to fully match what a compound glass lens is structured, but in significantly reduced size in thickness.

Figure 4A:
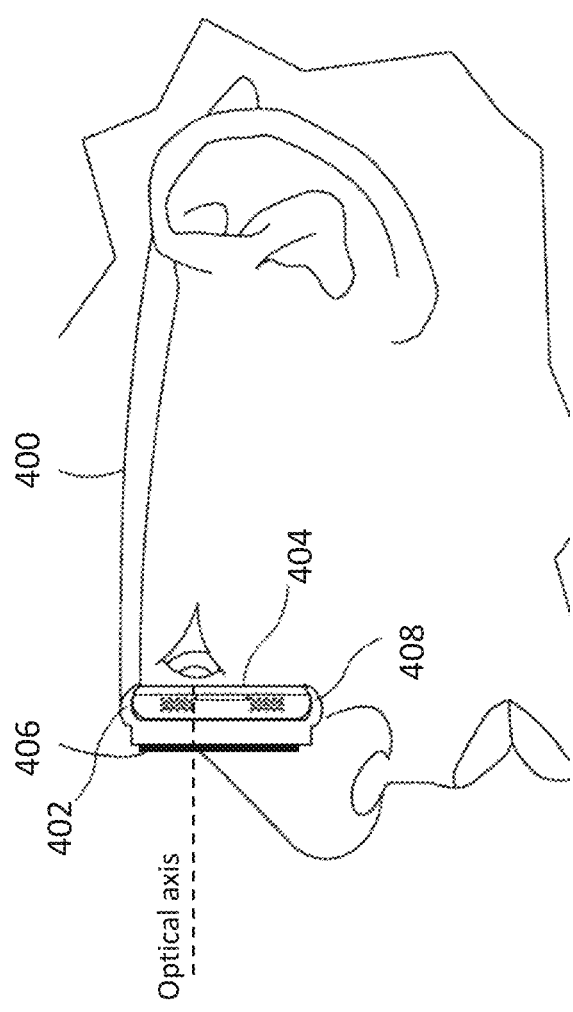
FIG. 4A shows a user wears a pair of glasses for AR/VR applications, where the glasses include at least one optical lightguide provided to centralize an image from a projection source, and the image is seen by the user through an exemplary lens of FIG. 3A.

Referring now to FIG. 4A, it shows a user wears a pair of glasses 400 for AR/VR applications. The glasses 400 include at least one optical lightguide 402 provided to centralize an image from a projection source (not shown). In operation, an image is projected from the source into the optical lightguide 402, where the image is formed therein and can be seen by the eye. According to one embodiment, the planar lens 300 of FIG. 3A may be used as a lens 404 and/or 406 enclosed in a frame 408. Depending on where the lens is used, the lens 404 and 406 function differently by forming the nanosized studs 304 accordingly for the purpose of the lens.

As an example, when the lens 404 is used, the nanosized studs 304 on the substrate 302 may be formed in different heights and/or spaced unevenly to help the vision of the eye focused onto a display in the lightguide 402. According to one embodiment, the nanosized studs 304 are oriented outwards from an optical axis line towards a center of the pupil to form an enlarging lens. As a result, the wearer of the glasses 400 can see an enlarged image through the lens 404. When the lens 406 is used, the nanosized studs 304 on the substrate 302 may be oriented considerably towards the optical axis to form a tinted lens.

Figure 4B:
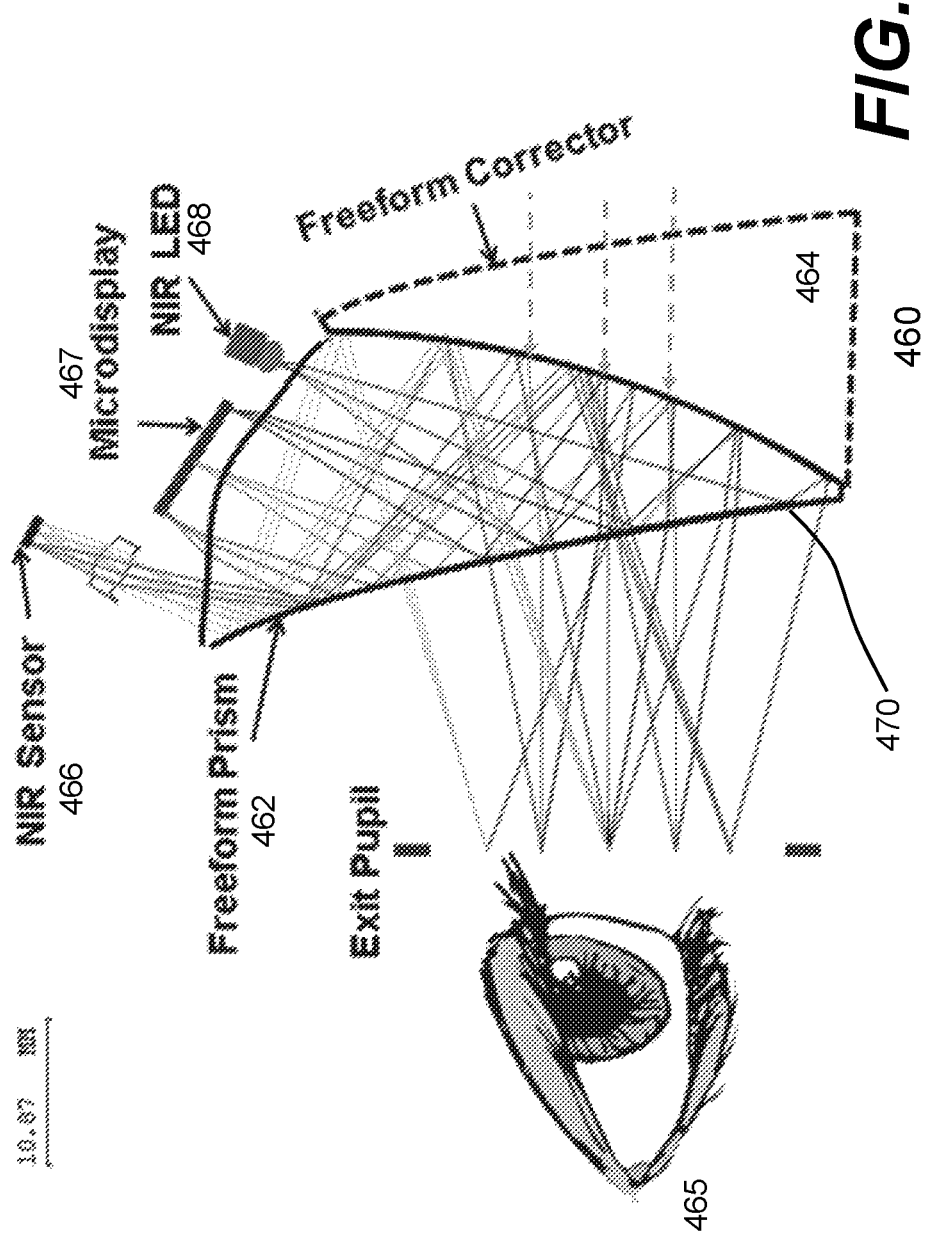
FIG. 4B shows an exemplary lens that may be used in the glasses shown in FIG. 4A.

Referring now to FIG. 4B, it shows an exemplary lens 460 that may be used in the glasses shown in FIG. 4A. The lens 460 includes two parts, a prism 462 and an optical correcting lens or corrector 464. The prism 462 and the corrector 464 are stacked to form the lens 460. As the name suggests, the optical corrector 464 is provided to correct the optical path from the prism 462 so that a light going through the prism 462 goes straight through the corrector 464. In other words, the refracted light from the prism 462 is corrected or de-refracted by the corrector 464. In optics, a prism is a transparent optical element with flat, polished surfaces that refract light. At least two of the flat surfaces must have an angle between them. The exact angles between the surfaces depend on the application. The traditional geometrical shape is that of a triangular prism with a triangular base and rectangular sides, and in colloquial use a prism usually refers to this type. Prisms can be made from any material that is transparent to the wavelengths for which they are designed. Typical materials include glass, plastic and fluorite. According to one embodiment, the type of the prism 462 is not in fact in the shape of geometric prisms, hence the prism 462 is referred herein as a freeform prism or lightguide, which leads the corrector 464 to a form complementary, reciprocal or conjugate to that of the prism 462 to form the lens 460.

On one edge of the lens 460 or the edge of the prism 462, there are at least three items utilizing the prism 462. Referenced by 467 is an imaging source that projects an image into the prism 462. Examples of the imaging source may include, but not be limited to, LCoS, LCD, and OLED. The projected image is refracted in the prism 462 and subsequently seen by the eye 465 in accordance with the shapes of the prism 462. In other words, a user wearing a pair of glasses employing the lens 462 can see the image being displayed through or in the prism 262. According to one embodiment, the lens 462 is coated with a planar lens without significantly adding weight (e.g., the planar lens 300 of FIG. 3A) that is formed as an enlarging lens. As a result, the projected image formed in the prism 462 can be seen by the eye 465 enlarged by a few factors (e.g., 10 times or more).

Figure 4C:
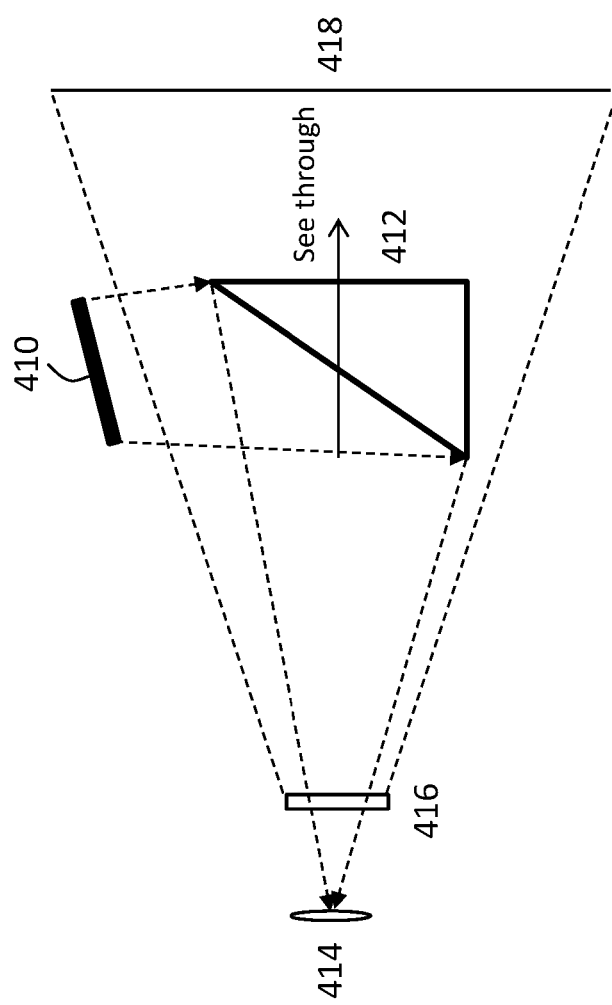
FIG. 4C shows a configuration of using a planar lens in a pair of AR/VR glasses.

Referring now to FIG. 4C, it shows a configuration of using a planar lens in a pair of AR/VR glasses. An image source 410 projects an image onto a polarizing beam splitter (PBS) 412 that redirects the image towards the eye 414 via a planer lens 416. Examples of the image source 410 may include, but not be limited to, LCOS, LCD, OLED, microdisplay and imaging medium. In the configuration in FIG. 4C, the image source 410 provides an image directly to the PBS 412 or indirectly via an optics. The planar lens 416 enlarges the image slightly, provided the nanoside studs are formed properly on the substrate. As a result, the eye 414 sees an enlarged optical image through the PBS 412, where the image appears far from the PBS 412.

Figure 4D:
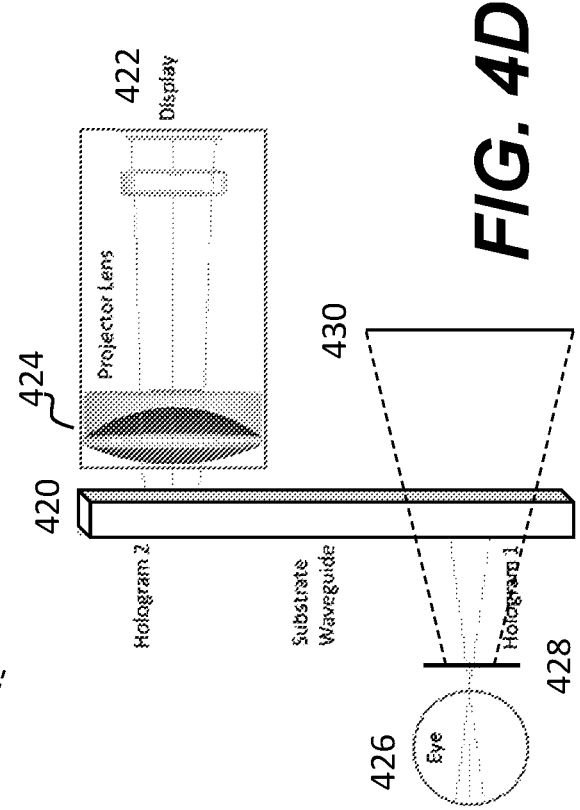
FIG. 4D shows a light guide or lightguide (i.e., a waveguide) guides a projected image from a microdisplay.

FIG. 4D shows a light guide or lightguide 420 (i.e., a waveguide) guides a projected image from a microdisplay 422. In one embodiment, an image from a microdisplay 422 is focused by optics 424 onto one end of the lightguide 420 that propagates the image to another end of the lightguide 420 where the image is seen by the eye through a planar lens 428. It is assumed that the nanoside studs are formed properly on the substrate for enlarging purpose. As a result, the eye 426 sees an enlarged optical image 430 through the planar lens 428, where the image 430 appears far from the lightguide 420.

Figure 5A:
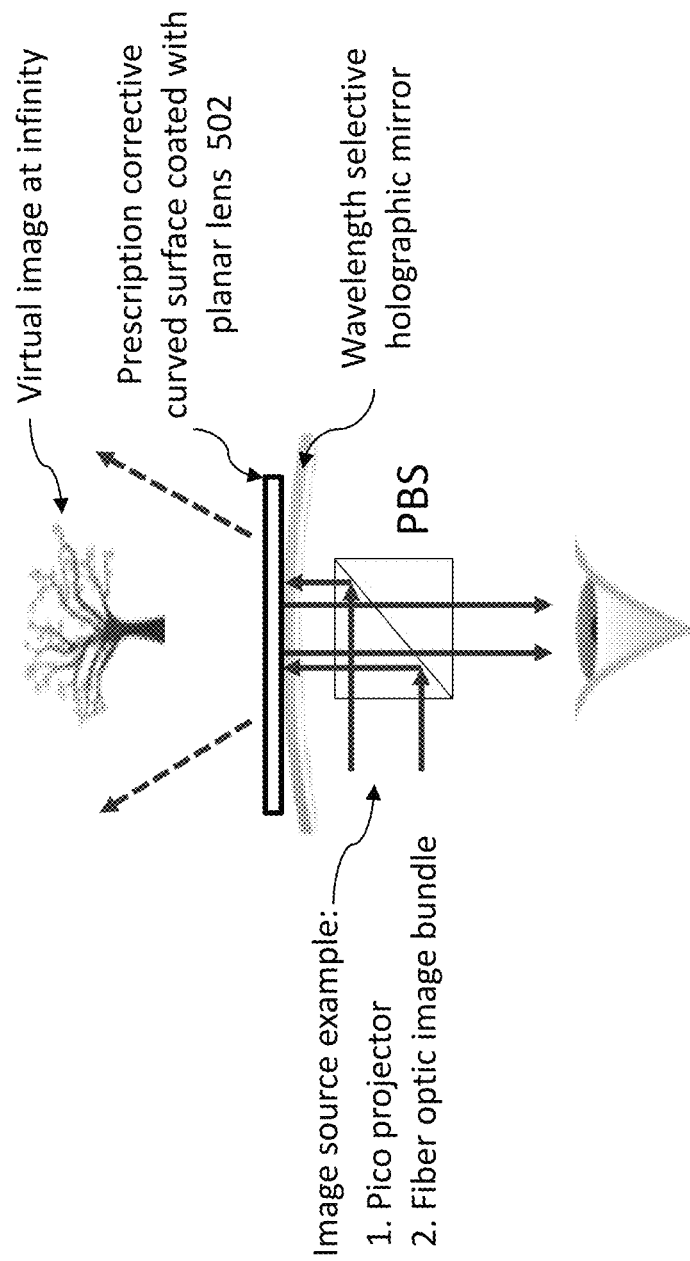
FIG. 5A shows an example for holographic applications that use refractive optics in AR setup.

FIG. 5A shows an example for holographic applications that use refractive optics in AR setup. It uses two full color holograms for such design on a thin photopolymer. The first one is a wavelength selective holographic spherical mirror that directs the image into the eye. The second one is a wavelength selective 45 degree holographic mirror. In one embodiment, the 45 degree mirror is tilted physically by 45 degrees to the second hologram. The display can be mounted above or to the side of the 45 degree mirror, but it must directly point at the mirror so the mirror reflects the signal. The light source can be LCD or LCOS and illuminated with LED's or Laser's. The light source can be positioned above or to the side of the 45 degree holographic mirror. A glass lens 502 is coated with a planar lens to enlarge the image that can be seen by the eyes.

Figure 5B:
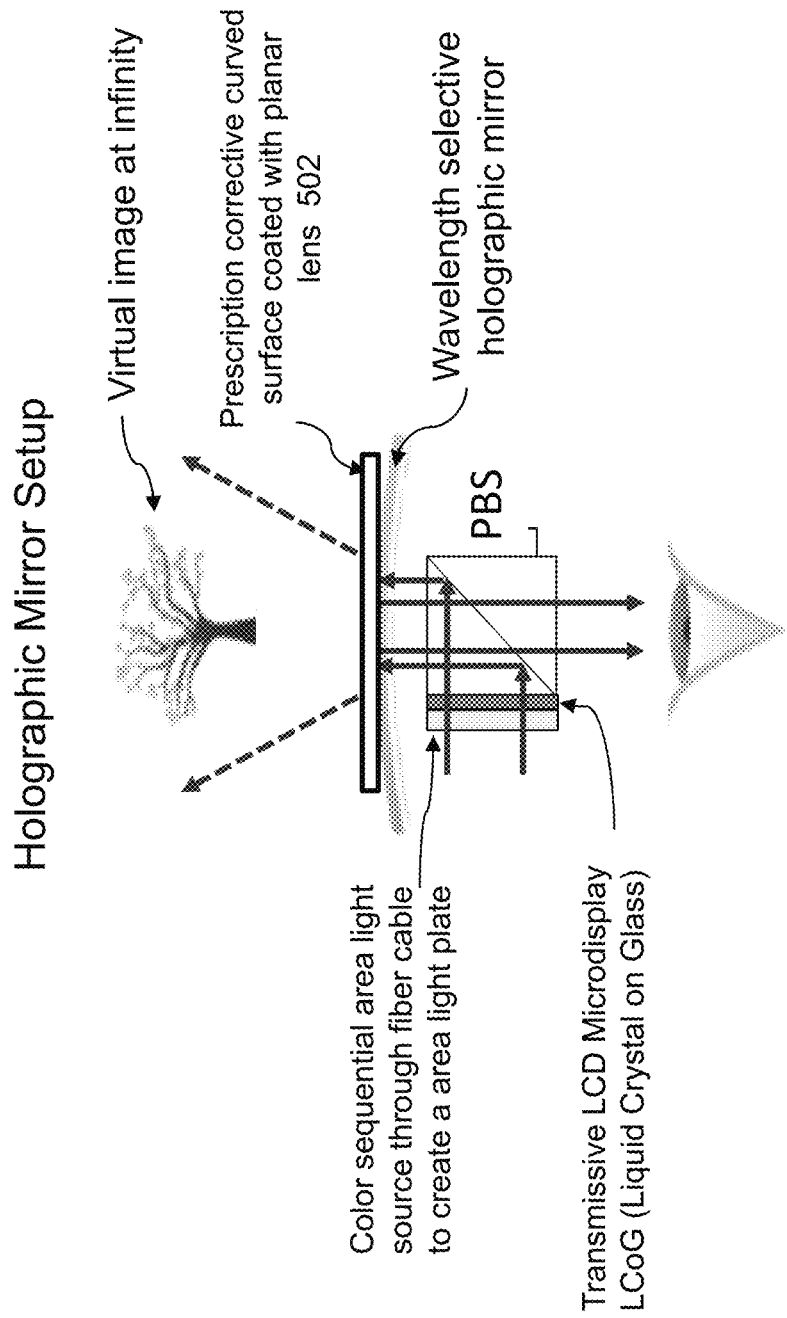
FIG. 5B shows another improved design of FIG. 5A.

FIG. 5B shows another improved design of FIG. 5A. This design 510 uses a transmissive LCoS (Liquid Crystal on Silicon) microdisplay that projects an image from the LCoS onto the cube. According to one embodiment, the LCoS is illuminated by R, G and B light sources to generate R, G and B color image sequentially. A glass lens 502 is coated with a planar lens to enlarge the image that can be seen by the eyes.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A display apparatus for displaying multimedia, the display apparatus comprising:

a planar lens system having at least one planar lens formed by a substrate and a plurality of nanosized studs, wherein the planar lens is formed with at least one type of metamaterial being a material engineered to have an optical property not found in nature; and an optical lightguide, receiving an image and forming the image therein, integrated with the planar lens system, wherein the optical lightguide is a glass lens provided as a medium to form the image therein, the image is seen through the planar lens system.

2. The display apparatus as recited in claim 1, wherein the nanosized studs are formed on the substrate by electron beam lithography and atomic layer deposition.

3. The display apparatus as recited in claim 2, wherein the nanosized studs are transparent.

4. The display apparatus as recited in claim 1, wherein the metamaterial is made from assemblies of multiple elements fashioned from composite materials.

5. The display apparatus as recited in claim 4, wherein the metamaterial has a relatively high refractive index at least greater than 2 and a level of stability, as well as high visible light transmittance.

6. The display apparatus as recited in claim 4, wherein the composite materials include one or more of metals and plastics.

7. The display apparatus as recited in claim 1, wherein the planar lens system includes additional planar lenses stacked on top of each other along an optical axis of the planar lens system, each of planar lenses is designed in different optical characteristics to perform what a traditional compound glass lens does.

8. The display apparatus as recited in claim 1, wherein the nanosized studs in the planar lens are arranged in a predefined pattern, each of the nanosized studs is structured with at least two layers of metamaterials, each interacting with colors in the image differently.

9. The display apparatus as recited in claim 1, wherein the nanosized studs are oriented towards a center of the substrate to function as a focusing lens.

10. The display apparatus as recited in claim 1, wherein the nanosized studs are oriented outwards a center of the substrate to function as an enclosing lens.

11. The display apparatus as recited in claim 10, wherein the image formed in the optical lightguide is seen magnified many times.

12. The display apparatus as recited in claim 1, further comprising: a corrector provided to correct the optical path from the optical lightguide so that a light going through the optical lightguide goes straight through the corrector.

13. The display apparatus as recited in claim 12, wherein the optical lightguide and the corrector are stacked to form an integrated lens.

14. A display apparatus for displaying multimedia, the display apparatus comprising:

a planar lens system having at least one planar lens including a substrate, wherein a plurality of nanosized studs are formed on the substrate by electron beam lithography and atomic layer deposition, the planar lens is formed with a metamaterial being a material engineered to have an optical property not simply found a material in nature;

an image source, producing an image, coated with the planar lens, wherein the image is seen through the planar lens system.

15. The display apparatus as recited in claim 14, wherein the metamaterial is made from assemblies of multiple elements fashioned from composite materials.

16. The display apparatus as recited in claim 15, wherein the metamaterial has a relatively high refractive index at least greater than 2 and a level of stability, as well as high visible light transmittance.

17. The display apparatus as recited in claim 14, wherein the composite materials include one or more of metals and plastics.

18. The display apparatus as recited in claim 14, wherein the nanosized studs are in different patterns.

19. The display apparatus as recited in claim 14, wherein the planar lens system includes additional planar lenses stacked on top of each other along an optical axis of the planar lens system, each of planar lenses is designed in different optical characteristics to perform what a traditional compound glass lens does.

* * * * *